United States Patent [19]

McClain

[11] 4,151,133

[45] * Apr. 24, 1979

[54] POLYMER DISPERSION PROCESS

[75] Inventor: Dorothee M. McClain, Cincinnati, Ohio

[73] Assignee: National Distillers and Chemical Corporation, New York, N.Y.

[ * ] Notice: The portion of the term of this patent subsequent to Apr. 10, 1996, has been disclaimed.

[21] Appl. No.: 824,873

[22] Filed: Aug. 15, 1977

[51] Int. Cl.$^2$ ............................ C08K 3/24; C08K 9/05
[52] U.S. Cl. ................................ 260/23 H; 260/18 R; 260/23 AR; 260/23 ST; 260/29.6 PM
[58] Field of Search ....... 260/23 H, 29.6 PM, 23 AR, 260/23 ST

[56] References Cited

U.S. PATENT DOCUMENTS

| 2,653,919 | 9/1953 | Hunter | 260/23 H |
| 3,586,654 | 6/1971 | Lerman et al. | 260/2.5 B |

FOREIGN PATENT DOCUMENTS 88404  1972  German Democratic Rep.

*Primary Examiner*—James H. Derrington
*Attorney, Agent, or Firm*—Kenneth D. Tremain

[57] ABSTRACT

A process for forming dispersions of ethylenevinyl acetate copolymers using an alkali metal soap of higher carboxylic acids as the dispersing agent.

10 Claims, No Drawings

POLYMER DISPERSION PROCESS

This invention relates to rapid processes for forming dispersions of thermoplastic resins, particularly resins of high molecular weight, in aqueous dispersion systems comprising alkali metal soaps of higher hydrocarbon carboxylic acids and water-soluble substantially neutral salts.

CROSS-REFERENCES

Reference is made to commonly assigned, concurrently filed U.S. Applications Serial Nos. 824,874; 824,875; 824,934; 824,935; and, 824,936, and commonly assigned U.S. Application Serial No. 564,198 filed Apr. 1, 1975.

BACKGROUND OF THE INVENTION

A vast art now exists which relates to the production of aqueous dispersions and emulsions of thermoplastic resins from the corresponding monomer or monomers by the methods of emulsion polymerization. These polymerizations are customarily performed in the presence of a considerable volume of water which may contain colloidal protectors or stabilizers, emulsifying agents of various kinds, free radical polymerization initiators, activators and promoters added to modify the action of the initiator, chain transfer agents for regulating molecular weight, chelating agents to intercept and neutralize the effect of metallic ions, as well as certain organic solvents to lower the freezing point of the system and otherwise modify the polymerization. Many of the thermoplastic polymers produced in this way by dispersion or emulsion polymerization can also be converted to powders by such processes as coagulation, spray drying, etc.

In general, the design of a useful dispersion or emulsion polymerization system poses two different but interrelated problems:

(a) the polymerization itself, which, as a process taking place in two or more discrete phases, is often extremely sensitive to changes in conditions and impurities; and (b) the colloid system which is the end product of the polymerization and is often unstable, variable in its properties and difficult to reproduce. And when the solid polymer product is isolated, it characteristically contains, as impurities, small amounts of the various substances introduced to promote the polymerization and stabilize the colloid system. In addition, dispersion and emulsion polymerization processes typically require several to many hours for completion, and are thus distinctly slow processes. In particular, the art discloses (U.S. Pat. No. 3,534,009) that in the batch emulsion polymerization of ethylene and vinyl acetate, an extraordinarily long polymerization time is required to consume all the vinyl acetate monomer charged, and it is necessary to resort to other means to accomplish this objective, such as reduction of ethylene pressure and the addition of more free-radical promoter. In this respect emulsion polymerization processes are at a decided disadvantage relative to the continuous, high pressure bulk polymerization processes now used commercially for the manufacture of low density polyethylene and ethylene copolymers. These latter processes proceed at exceedingly rapid rates; for example in a typical low density polyethylene process, as carried out in a reactor of the type described in U.S. Pat. No. 3,756,996, the polymerization times are of the order of 35 to 45 seconds at a conversion of 12 to 20%, and, the total time required to convert monomer(s) to finished polymer is about 10 minutes.

A further disadvantage of the dispersion and emulsion polymerization processes of the art is that they are as yet of no, or only limited applicability in the manufacture of several important thermoplastic resins of commerce. For example, when ethylene is polymerized in emulsion, polyethylene is produced at typical emulsion polymerization rates (1–7 hours), but it contains residues derived from the emulsifier and a relatively large low molecular weight fraction [G. J. Mantel et al, J. Appl. Polymer Sci., 9, 1797, 1807, (1965); 10, 81,1845 (1966)]. Emulsion polymerization is substantially of no utility in the polymerization of such monomers as propylene, higher alpha-olefins and isobutylene, since these monomers do not produce high polymers by a radical mechanism. Much the same situation holds for the thermoplastic resins produced by polycondensation processes.

It has long been known that many low molecular weight polymers, e.g., various waxes and hydrocarbon resins, can be emulsified in water by first dissolving them in an organic solvent, then contacting the organic solution of the polymer with water in the presence of surface active agents and emulsifiers, and thereafter recovering the organic solvent. This basic process has also been extended to true high polymers. Thus a process is known (U.S. Pat. No. 3,347,811) for preparing aqueous dispersions of ethylene copolymers which comprises (a) dissolving the copolymer in a water-immiscible organic solvent of b.p. 40°–160° C.; (b) emulsifying the solution in a mixture of water and a dissolved surfactant of HLB number of at least 18; and (c) evaporating the organic solvent from the resulting emulsion.

Similarly it is known (U.S. Pat. No. 3,503,917) to prepare artificial latexes, e.g., of polyisobutylene-isoprene copolymer (butyl rubber) and ethylene-propylene rubber, by dissolving the preformed polymers in an organic solvent such as toluene, emulsifying the organic solution of the polymer in water in the presence of a surface active agent, and finally stripping the organic solvent. It is especially to be noted that these processes of the art for dispersion of true high polymers are by their very nature complicated, laborious and, above all, comparatively slow.

In recent years, however, a new simplified process (U.S. Pat. No. 3,422,049; U.S. Pat. No. 3,746,631) has been developed for making dispersions of high molecular weight thermoplastics in water, without the need for an organic solvent. In several important respects the new process differs from all other polymer dispersion processes of the art:

(1) It is a rapid process, requiring a residence time of about 15–20 minutes in its continuous version (U.S. Pat. No. 3,432,483), and operates at 115° C. to 300° C. in the presence of only water and a surfactant, for which reason it is often called the "water process". In view of the short contact time, it is therefore particularly advantageous to couple the water process with the above-mentioned, equally rapid, high pressure process for making polyethylene and ethylene copolymers; when this is done, dispersions of these polymers can be produced from monomers in overall process times of the order of a half-hour or less (2) However, prior to the present invention, only a very unique class of surfactants, certain block copolymers of ethylene oxide and propylene oxide, could be used to produce the dispersions.

(3) The particles produced are substantially all spherical, very fine, and tend to be of a narrow particle size range; low density polyethylene, for example, is converted to spherical particles having a number-average particle diameter of about 10 microns, and a weight average diameter of about 25 microns.

(4) Since the water-process does not require the use of an organic solvent, it avoids all the disadvantages associated with prior art processes requiring solvents, such as: solvent loss during processing with attendant air pollution; the fire hazard inherent in solvent usage, and the time and energy expended in dissolving a high polymer in a solvent, and in recovering and recycling the solvent. However, when it is desired to make dispersions of even finer particle size, i.e., particles of submicron diameter (U.S. Pat. No. 3,418,265), limited amounts of organic solvent are advantageously added in the water process, but in amounts of only 0.5 to 20 parts per 100 parts of the resin to be dispersed, amounts that are far less than those required to disperse the resin in the other processes of the prior art. Additionally, in another version of the water process (U.S. Pat. No. 3,522,036), limited amounts of a liquid vinyl monomer, e.g., styrene, may also be added to provide stable, film-forming aqueous latices of high molecular weight polyethylene. In still other variants it is possible to produce foamed particles (U.S. Pat. No. 3,472,801) or to incorporate certain colorants (U.S. Pat. No. 3,449,291) and pigments (U.S. Pat. No. 3,675,736) in the particles.

The above described fine powders are, by virtue of their small particle size, their narrow particle size range, and their spherical particle shape, unique states of matter which cannot readily be prepared by conventional procedures known to the art. However, as already pointed out above, a unique nonionic surfactant or dispersing agent is required, i.e., the aforesaid block copolymer of ethylene oxide and propylene oxide more fully described in U.S. Pat. No. 3,422,049 and sold under the trade name of Pluronics by BASF-Wyandotte Corp. Nevertheless, as experience has accumulated in the use of these nonionic dispersants, certain disadvantages have become apparent. The very fine particle size fraction they produce, e.g., the aforesaid 10 micron particle can present problems in certain situations:

(a) fractions comprising particles 10 microns or less in diameter are classified as "respirable dusts" and may present a health hazard if they escape into the work place air;

(b) in addition, these ultrafine fractions can at times cause problems in powder handling equipment because of plugging and blockage.

Although art related to the water-process (U.S. Pat. No. 3,586,654) does disclose that the particles produced by that dispersion process may be reformed into particles that are the same, larger, or smaller in diameter, this conversion involves two operations and it requires the use of such large amounts of Pluronic dispersant as to be relatively disadvantageous from an economic point of view. Consequently, it would be highly desirable to modify the water-process in such a manner as to be able to disperse thermoplastic resins into particles of any desired particle size in one operation, and to achieve this goal by using economically acceptable levels of dispersing agent (preferably up to about 15 pph of resin), i.e. by substituting a simple dispersion system comprised of readily available components and which obviates some, if not all, of the difficulties encountered with the Pluronic dispersants.

Moreover, increasing petroleum prices make it highly desirable, again for economic reasons to eliminate, if possible the requirement for the petroleum-based Pluronic dispersants. Additionally, as disclosed in commonly assigned, copending application, Ser. No. 564,198, dealing with the simultaneous saponification and dispersion of ethylene-vinyl acetate copolymers, it appears that the Pluronic dispersants are quite sensitive to the presence of metallic salts. When the polymer to be dispersed contained 0.1% or more of sodium ion, the copolymer could not be dispersed to a fine particle size until the sodium ion content is reduced to less than 0.1%.

It is known in the art to employ soaps as emulsifying agents in the emulsion copolymerization of monomers such as styrene and butadiene to produce latices of synthetic rubber. It is further known that the dispersed or emulsified synthetic rubber particles may be coagulated by adding salt or salt and acid to the latices; in this way the rubber may be conveniently recovered as a rubbery crumb. Moreover, if desired, the particle agglomeration process may be arrested at an intermediate particle size by adding salt to the latex, and/or by forming a salt in situ by adding an acid and later a base. Rhines (U.S. Pat. No. 2,538,273), for example, shows that in this latter process, the amount of acid and/or salt necessary to increase particle size can be reduced by also adding an alcohol.

The processes of the present invention, however, differ fundamentally from these teachings of the art in the following important respects:

1. They relate to the dispersion of already-formed synthetic resins, principally and advantageously to those selected from a hereinafter described group of synthetic resins that cannot readily or conveniently be made by emulsion or dispersion polymerization of the respective monomer or monomers.

2. They represent dispersion processes wherein both the soap and the salt are simultaneously present during the dispersion process itself. This contrasts with the above-cited processes of the art in which the salt is added as a coagulant after a latex has been made by emulsion polymerization in the presence of a soap.

3. They relate to the dispersion of already-formed synthetic resins that contain 15 to 35 weight percent of a polar comonomer, and which may usually be dispersed by a soap alone although the particle size is generally relatively coarse, and can be significantly reduced if a salt is also present during the dispersion process. In situ soaps provide finer particles than preformed soaps.

4. They represent dispersion processes in which an optimum salt concentration can be discerned, below which the salt has relatively little effect on particle size and above which the dispersion process fails altogether. The optimum salt concentrations are well below salt concentrations of the art normally employed for latex coagulation, where no upper salt concentration ordinarily exists as far as coagulation is concerned.

5. They represent dispersion processes in which variables such as the nature of the resin, i.e., its composition and melt viscosity; the resin solids content, i.e., ratio of resin to water; nature of the soap, i.e., size of the acid residue, the identity of the cation, and whether the soap is made in situ or added preformed; the concentration of the soap; and the concentration of the salt are all interrelated with each other and especially with the dispersion temperature selected. This dynamic system of variables is much more intricate in nature than latex coagulation processes of the art.

Processes for simultaneously dispersing and saponifying ethylene-vinyl acetate (EVA) copolymers to provide particulate hydrolyzed ethylene-vinyl acetate (HEVA) copolymers are known. In German Democratic Republic (DDR) Patent Specification No. 88,404, there is described a process for simultaneously dispersing and saponifying EVA copolymers employing sodium hydroxide or potassium hydroxide as the saponification agent and an alkyl sulfonate, an acyl derivative of N-methyltaurine, a higher fatty acid soap, an alkaryl sulfonate or a nonionic surface-active agent derived from ethylene oxide as the dispersion agent.

The process described involves saponifying ethylenevinyl acetate copolymers at elevated temperature and pressure including, as the final step, discharging the reaction mixture at the operating temperature and pressure directly into a quench vessel at atmospheric or subatmospheric pressure. The quench vessel contains water that is stirred during the discharge operation and the rate of discharge of the reaction mixture is regulated by means of a needle valve. Thus, the sudden release of the reaction mixture causing a portion of the reaction medium to vaporize apparently results in formation of the dispersion due to the atomizing effect of the needle valve. This patent also discloses the optional use of dispersants, but it is apparent from the data provided that such dispersants have only a secondary effect, the primary determinant of dispersion being the discharge of the hot reaction mixture to the quenching bath. From the particle size distribution data provided in the disclosure, it is clear that the presence of dispersing agent seems to favor smaller particles, but is not absolutely essential since comparable dispersions are obtained when dispersing agents are not present in the reaction mixture. There is no indication that a dispersion of the polymer occurs in the reaction mixture prior to discharge when dispersing agents are present but the data provided shows that, on discharge, a dispersion is produced in the presence or absence of dispersing agent. Attempts to obtain dispersions of saponified EVA using N-oleoylsarcosinate as dispersing agent by merely cooling the reaction mixture without the described discharge step of DDR 88,404 have not produced dispersions. Similarly, when arylsulfonate dispersants are employed in lieu of the sarcosinate, no dispersions are obtained when the reaction mixture is cooled. Thus, it must be concluded that dispersion only occurs on discharge.

The dispersed product obtained by the method of DDR 88,404 is of fairly large particle size, the heavy majority of the particles being of diameters greater than 0.125 mm, i.e., usually over 80% of the dispersed particles. In addition, the product is composed of irregular particles, with no spherical particles being observed.

In accordance with the present invention, desirable improvements are achieved by substituting dispersant systems comprising alkali metal soaps higher carboxylic acids in conjunction with certain water-soluble salts for the unique Pluronic dispersing agents of U.S. Pat. Nos. 3,422,049 and 3,476,631.

This invention provides dispersing systems for dispersing high molecular weight copolymers of olefins in water at rapid rates and avoids the need for an organic solvent. The novel dispersing systems thus provided generally yield particles that are larger than those produced by the Pluronic dispersing agents of the art and afford a wider range of particle size than the Pluronic dispersants, without, however, requiring the use of large amounts of dispersant. Additionally, they practically eliminate the at times objectionable ultrafine, 10-micron or less particle fractions present in powders produced by the Pluronic dispersants.

In general, the present process can be carried out substantially as described in the basic water-process patent (U.S. Pat. No. 3,422,049), with the exception that the Pluronic surfactants of that process are replaced with dispersing agents comprising a soap of a higher carboxylic acid and a water-soluble salt.

Thus, in batch operation, the polymer, water (preferably distilled or deionized) and the dispersant system are introduced into a pressure vessel equipped with an external heater, a thermocouple, and a stirrer. The vessel is sealed, heated to 150°–270° C. and held at the selected temperature for a brief period, usually seven minutes, during which time rapid stirring is applied. Thereafter the heater is shut off and the vessel is allowed to cool with stirring, and optionally with externally-applied cooling for convenience. When the temperature of the contents of the vessel has fallen below about 100° C., the product is discharged, optionally diluted with additional deionized or distilled water and allowed to cool to room temperature. The dispersions may, if desired, be used directly in various applications. Filtration of the dispersions normally permits the separation of the polymer particles and soap as a filter cake, and the water-soluble salts pass into the filtrate. EVA copolymer particles containing about 15 to 25 weight percent vinyl acetate can normally be washed free of soap with hot (70°–95° C.) water. However, EVA copolymer particles containing about 25 to 35 weight percent vinyl acetate and tend to coalesce and may require additional treatment. Such treatment may consist of acidification of the soap to release higher carboxylic acid or reaction with an alkaline earth metal salt, e.g., $Ca(OH)_2$, to convert the soap to an alkaline earth metal soap. The protective action of these materials permits easy washing and drying of the particles without coalescence. Such techniques are described in commonly assigned, concurrently filed copending U.S. Patent Application Ser. No. 824,935. The filter cake is washed with cold water, preferably deionized or distilled, to remove contained water-soluble, substantially neutral salt and the washings are combined with the mother liquor. The combined mother liquor and washings contain substantially all of the water-soluble salt, but very little of any soap or higher carboxylic acid if this has been released as a parting by acidification of the soap dispersant. The acid employed for acidification is desirably selected to match the anion of the water-soluble, substantially neutral salt, e.g., hydrochloric acid for sodium chloride. When a metal salt, e.g., calcium hydroxide, is added to convert the higher carboxylic acid soap to an insoluble soap (calcium soap) for a parting, the mother liquor will contain alkali metal hydroxide which can be recycled, for example to make additional in situ soap or simply neutralized to provide more water-soluble salt. Normally a substantial proportion of the water is then removed by distillation and the residue, containing substantially all of the water-soluble salt and alkali (if any) can be recycled.

DESCRIPTION OF PREFERRED EMBODIMENTS

The substrate, i.e. the polymer to be dispersed, is a copolymer of an olefin containing from about 15 to about 35 weight percent of a polar comonomer, e.g. vinyl acetate. The dispersant system is a soap in the presence of a water-soluble, substantially neutral salt. The soap employed can be preformed soap or alternatively the soap can be produced in situ, with substantially the same results as far as dispersion formation is concerned, but with the in situ soap favoring smaller particle size.

Each of the components may be introduced independently and separately but it is also possible to combine two or more of the components before introduction into the dispersion vessel. For example, the water-soluble salt and the preformed soap, when used, are conveniently added in solution in part of the water used to produce the dispersion. Where in situ soaps are employed, the base introduced to neutralize the acid may also be added in aqueous solution, either in a separate solution or in the same solution as the water-soluble salt. However, it is preferred not to add a preformed soap in the same solution as the water soluble salt. The polymer itself may also be employed as a medium for introducing the other components. Thus, for example, where an in situ soap is desired, it is convenient to blend the acid into the polymer before introduction into the dispersion, and, where a preformed soap is employed, this, too, can be blended into the polymer prior to dispersion. Less commonly, the water-soluble salt is blended into the polymer before dispersion, either alone or in combination with the acid for making in situ soap. The practice of blending into the polymer water-soluble salt, higher carboxylic acid for in situ soap and base to make the in situ soap before dispersion is ordinarily not preferred.

As an alternative in situ soap formation, the soap can be formed from a glyceride or other ester by saponification with slightly more than the stoichiometrically required amount of base. The triglyceride or other acid ester may be added directly to the dispersion vessel or previously blended into the polymer along with the other dispersion components.

The various embodiments of the invention may also be carried out as a continuous operation, in the manner described in U.S. Pat. No. 3,432,483. In such continuous operation the polymer to be dispersed is fed to the bottom of the dispersion vessel and the dispersion is removed at the top of the dispersion vessel. Separate lines supplying the various components of the dispersion enter the bottom of the vessel itself which can be provided with a pre-mixing zone. The components may be introduced separately or in combination as hereinbefore described.

In general the properties of the type of polymers dispersed are not significantly affected by the dispersion process although some small degree of saponification may occur.

Although it is more advantageous to employ the process to disperse high molecular weight polymers, that is to say polymers having a number average molecular weight of about 10,000 and above, this should not be understood as limiting the process to such polymers, since it is also within the scope of the invention to disperse polymers having a number average molecular weight below about 10,000 even as low as about 1000–1500. Mixtures of polymers may be dispersed.

The type of polymer that is dispersible by the process of the invention is not limited in any way as to method of synthesis. In general, however, the polymers selected will most often be made by free radical addition polymerization processes used commercially to manufacture low density polyethylene. Certain other dispersible polymers are made by Ziegler-Natta and Phillips polymerization processes, and even by low temperature cationic polymerization. Polymers made by various types of polycondensation may also be dispersed. Nor are the polymers that may be dispersed by the process of the invention limited as to the number of different repeat units that make up the chain molecules, or the order of their occurrence. Included are random copolymers, alternating copolymers, block polymers and graft polymers.

Examples of the classes of polymers that are dispersible by this invention are olefin-vinyl ester copolymers, ethylene-vinyl alcohol copolymers, olefin-acrylate ester copolymers, ethylene-vinyl ester-vinyl alcohol terpolymers, olefin-vinyl ester-sulfur dioxide terpolymers, olefin-vinyl ester-carbon monoxide terpolymers, olefin-vinyl ester-vinyl alcohol-carbon monoxide tetrapolymers and acrylate and methacrylate ester homo- and copolymers. Moreover, analogous styrenic polymers, polyphenylene oxides, polyphenylene sulfides, polyaryl sulfones, polyethersulfones, polyimides, polyesters, polyamides, polyurethanes, and cellulosics are also within the scope of the invention.

Specific examples are poly(ethylene-co-vinyl acetate) containing from about 15 to about 35 weight percent vinyl acetate; poly(ethylene-co-methyl acrylate) and poly(ethylene-co-ethyl acrylate) containing from about 15 to about 35 weight percent of the acrylate ester; poly(styrene-co-acrylonitrile) with from about 15 to about 35 weight percent acrylonitrile; poly(ethylene-co-vinyl acetate-co-vinyl alcohol) containing from about 15 to about 35 weight percent of combined vinyl acetate and vinyl alcohol, poly(ethylene-co-vinyl acetate-co-sulfur dioxide or co-carbon monoxide) with from about 15 to about 35 weight percent of total monomer units other than ethylene, and poly(ethylene-co-vinyl alcohol-co-sulfur dioxide or co-carbon monoxide) also containing from about 15 to about 35 weight percent of monomer units other than ethylene.

The preferred soaps are soaps of alkali metals of atomic weight of at least 23, i.e. sodium, potassium, rubidium and cesium, and, of these, the more preferred are sodium and potassium because of the availability or ease of preparation, the most preferred being sodium which is most economical and practical.

The soaps for use in the present invention are known compounds, i.e. salts of higher carboxylic acids with the alkali metals. The acid moiety of the soap can be saturated or unsaturated, most commonly ethylenically-unsaturated, linear or branched and can be composed of a mixture of such acids, for example as is obtained by saponification of natural glyceride fats. Included in the term "higher carboxylic acid" as used in this invention are the so-called dimer acids made by dimerization of polyunsaturated linear fatty acids. The soap should not react adversely to any appreciable extent with the polymer substrate, i.e. should be substantially inert to the polymer. As employed herein, and in the appended claims, the term "soap" embraces the aforesaid salts of higher carboxylic acids, particularly the well-known fatty acids.

The preferred acid is a straight-chain $C_8$-$C_{22}$ monocarboxylic acid, which may be saturated or may contain one or more carbon-carbon double bonds per molecule, and may contain even or odd number of carbon atoms. Examples are caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic (arachic) acid, heneicosanoic acid, behenic acid, 10-undecylenic acid, elaidic acid, oleic acid, erucic acid, brassidic acid, linoleic acid, and linolenic acid as well as mixtures of such acids and dimer acids made by dimerization of polyunsaturated fatty acids, e.g. linolenic acid. Dimeric acids are commercially available and contain 75–95% dimer, 4–25% trimer, and from a trace to 3% of monomeric polyunsaturated fatty acid.

Where a preformed soap is introduced, it will be a soap prepared by neutralization of one of the above disclosed acids or mixtures, with one or mixtures of the bases disclosed below or alternatively, commercially available fatty acid salts can be used.

When an in situ soap is employed, the soap is formed by reacting the acid with an alkali metal hydroxide. Alternatively, the corresponding bicarbonate or carbonate can be used. Examples of the alkali metal hydroxide that may be used are sodium hydroxide, potassium hydroxide, lithium hydroxide, rubidium hydroxide and cesium hydroxide; sodium bicarbonate and sodium carbonate; potassium bicarbonate and potassium carbonate; rubidium bicarbonate and rubidium carbonate; and cesium bicarbonate and carbonate may be substituted for the corresponding hydroxides. Mixtures of the said alkali metal compounds can be employed.

The water-soluble salt is a substantially neutral salt. For the purposes of this invention, such a salt is defined as one that, at a concentration of 1 molar in pure water at 20° C. produces a solution whose pH lies between 4 and 9. The cation of the salt is derived from an alkali metal or any other metal that does not form insoluble soaps with the above-disclosed fatty acid selected, at the operating temperature of the process, i.e., is inert to the soap employed. The cation may be monovalent, divalent or of higher valence. The nature of the anion of the salt does not appear to be critical; the anion can be for example, fluoride, chloride, bromide, iodide, bisulfate, sulfate, hydrogen phosphate, dihydrogen phosphate, nitrate, bicarbonate, acetate or proprionate anion, or similar such anions. Mixtures of salts can be employed.

Specific examples of the water-soluble, substantially neutral salts are lithium fluoride, lithium chloride, sodium chloride, sodium bisulfate, sodium sulfate, sodium hydrogen phosphate, ammonium chloride, potassium dihydrogen phosphate, sodium acetate, sodium propionate, etc. The cation of the soap and the water-soluble salt may be the same or different.

It is usually preferred that the ratio of polymer to water range from about 0.1 to about 3 parts of polymer per part of water on a weight basis. Lower ratios are operable, but uneconomical, whereas higher ratios, though usable, present operational difficulties. The most preferred range is about 0.25 to about 0.65 parts of polymer per part of water on a weight basis. For in situ soap formation, the mole ratio of base to the amount of higher carboxylic acid may vary broadly from about 1.0 to about 1.15, the preferred ratio is from about 1.05 to about 1.10. Lower ratios are operable but may result in increased tackiness of the polymer due to solution of unneutralized higher carboxylic acid therein. Higher ratios are of no advantage and must be avoided in dispersing the EVA copolymers of this invention to prevent substantial hydrolysis. The weight ratio of higher carboxylic acid soap to polymer may vary from about 0.01 to about 0.30, the preferred ratio being from about 0.03 to about 0.12. The use of lower ratios of soap does not always result in the desired dispersion of the polymer; higher ratios are generally unnecessary and therefore uneconomical. The preferred higher carboxylic acid is a fatty acid, the most preferred fatty acid being stearic acid, and the preferred fatty acid soap is sodium stearate.

The concentration of water-soluble, substantially neutral salt in water may range from at least about 0.1 and up to about 15 weight percent, the preferred concentration being from about 1 to about 7 weight percent. Dispersions are not readily obtained at lower concentrations and higher concentrations are unnecessary. In addition, higher concentrations may tend to cause larger particle size. Thus there appears to be an optimum salt concentration. Sodium chloride, sodium sulfate, and sodium acetate are the preferred water-soluble salts. These salts are preferred because hydrochloric acid, sulfuric acid, or acetic acid respectively, may then be used to convert recovered sodium stearate to stearic acid for recycle, when in situ sodium stearate is employed, while producing the same water-soluble salt used in the dispersion. Halide salts, particularly chlorides, though operable, are not preferred with stainless steel equipment because of the tendency to cause stress cracking of the steel. A nickel alloy (Monel) is preferred for chloride service.

The dispersion temperature may range from about 100° C. to about 300° C., but temperatures of from about 150° C. to about 270° C. are preferred. Dispersions are usually not readily obtainable at lower temperatures and higher temperatures are usually not required for successful dispersion. The pressure is autogenous. The rate of stirring should vary from about 1800 to about 4000 rpm with from about 2200 to about 3800 rpm being preferred, although stirring rates that are lower are at times sufficient. Higher stirring rates may be employed but usually are not advantageous. The dispersion times range from about 1 minutes to about 1 hour; times of about 5 to about 15 minutes are preferred.

The dispersions of the polymer substrate produced in accordance with the present invention are generally composed of particles, usually spherical, of an average diameter ranging from about 20 microns up to about 500 microns, with the vast majority (70-90%) of particles being less than 250 microns. With the preferred dispersing systems, a substantial majority of the particles are less than about 150 microns, usually ranging from about 20 to about 150 microns with most of the particles being in the range of about 50 to about 100 microns. As should be expected, the efficiency of the present dispersion process and the particle size of the dispersed product will vary to a certain extent with the selected soap and salt, the temperature, the amounts of reagents employed and other factors with which those skilled in the art are familiar.

The dispersion product as obtained can be used as such, or alternatively can be subjected to screening to isolate specific particle size product. Especially valuable are particles in the range of from about 40 to about 150 microns, which are especially useful for coating formation.

The relative molecular weights of the polymers of this invention are compared by means of their melt flow rates and/or their Mooney viscosities. Melt flow rate, abbreviated MFR, was determined according to ASTM D 1238-65T, Condition B. In some cases Condition E of this procedure was used; such melt flow rates are called "melt indexes" herein. Mooney viscosities were determined according to ASTM D 1646. The polymers of this invention were also characterized by means of their vinyl acetate content. The vinyl acetate content was determined by a special saponification procedure involving the use of toluene as a solvent and ethanolic KOH solution as the saponifying agent. The results are reported as weight-percent vinyl acetate, abbreviated as "wt.% VA".

the reactor is cooled externally with dry ice until the temperature of the contents is about 90° C. The dispersion is diluted with an equal volume of water, and this mixture is filtered on a Buchner funnel fitted with a #41 H Whatman filter paper. The residue is washed thoroughly with water and dried.

This example shows the effect of added salt on both preformed and in situ soap in the dispersion of the ethylene-vinyl acetate copolymers. The substrates and reagents are given in Table 1A and the results are given in Table 1B from which it is clear that the dispersing systems which include salt provide dispersions of finer particle size, i.e. experiments 1 and 3.

TABLE IA

| | Resin | | | | | Preformed | In Situ Sodium Stearate | |
|---|---|---|---|---|---|---|---|---|
| Exp. No. | Percent Vinyl Acetate | Melt Index | g. | NaCl, g. | Water, ml. | Sodium Stearate g. | Stearic Acid g. | NaOH g. |
| 1 | 19.8 | 10.6 | 150 | 17.5 | 450 | — | 13.9 | 1 |
| 2 | 19.8 | 10.6 | 150 | — | 450 | — | 13.9 | 1.95 |
| 3 | 27.5 | 29.2 | 150 | 17.5 | 450 | 15.0 | — | — |
| 4 | 27.5 | 29.2 | 150 | — | 450 | 15.0 | — | — |

TABLE IB

| | | Percent of Fines Having Particle Size (Microns) of: | | | | | | | |
|---|---|---|---|---|---|---|---|---|---|
| Exp. No. | Percent Dispersed | <37 | 37–53 | 53–75 | 75–105 | 105–149 | 149–177 | 177–250 | 250–420 | >420 |
| 1 | 100 | 34.1 | 30.9 | 23.8 | 7.9 | 7.4 | .5 | .3 | — | — |
| 2 | 90 | .1 | .5 | 6.0 | 12.1 | 28.4 | 22.6 | 18.6 | 3.5 | 3.1 |
| 3 | 100 | 24.2 | 29.6 | 37.7 | 8.1 | .2 | .1 | ← | Trace | → |
| 4 | 70 | — | .1 | .2 | .4 | 1.1 | 1.4 | 8.8 | 72.7 | 15.4 |

EXAMPLE 2

The procedure of Example 1 is repeated employing preformed and in situ sodium stearate with an EVA copolymer containing about 20% VA.

The results are given in Tables 2A and 2B.

TABLE 2A

| | Resin | | | | | Preformed | In Situ Sodium Stearate | |
|---|---|---|---|---|---|---|---|---|
| Exp. No. | Percent Vinyl Acetate | Melt Index g/10 min. | g. | NaCl, g. | Water, ml. | Sodium Stearate g. | Stearic Acid g. | NaOH g. |
| 1 | 19.8 | 10.6 | 150 | 17.5 | 450 | 15.0 | — | — |
| 2 | 19.8 | 10.6 | 150 | 17.5 | 450 | — | 13.9 | 1.95 |

TABLE 2B

| | | Percent of Fines Having Particle Size (Microns) of: | | | | | | | |
|---|---|---|---|---|---|---|---|---|---|
| Exp. No. | Percent Dispersed | <37 | 37–53 | 53–75 | 75–105 | 105–149 | 149–177 | 177–250 | 250–420 | >420 |
| 1 | 100 | 17.0 | 22.2 | 25.9 | 18.8 | 9.3 | 3.7 | 4.7 | 2.6 | .8 |
| 2 | 100 | 34.1 | 30.9 | 23.8 | 7.9 | 2.4 | .5 | .3 | — | — |

EXAMPLE 1

Dispersion experiments are performed in a cylindrical one-liter Monel metal pressure reactor (Parr Instrument Company) equipped with a thermowell, a safety head, a stirrer bearing and shaft and a pressure gage. Power is supplied to the stirrer by means of a drill press driven by a one-horsepower motor (d.c.) The stirring impellers comprise two carved-tooth turbine-type discs. To the pressure reactor is added the distilled water, and the amount of polymer and soap indicated in Table IA. Heat is applied until the temperature of the mixture reaches 235° C. Stirring is then started and continued at a rate in the range of 2800–3800 rpm for a period of 8 to 10 minutes. Stirring is reduced to about 1500 rpm and

What is claimed is:

1. A process for dispersing an olefin polymer containing from about 15% up to about 35% polar comonomer which comprises agitating said polymer in molten state in an aqueous dispersion system comprising an alkali metal soap together with a water-soluble substantially neutral salt inert to said soap and cooling said system with the polymer in the disperse state to below about 100° C.

2. A process according to claim 1 wherein the dispersion system comprises an alkali metal soap of a saturated fatty acid containing from about 10 to about 22 carbon atoms.

3. A process according to claim 1 wherein said salt comprises an alkali metal salt.

4. A process according to claim 1 wherein said soap comprises an alkali metal stearate.

5. A process according to claim 4 wherein said salt comprises an alkali metal salt.

6. A process according to claim 1 wherein the polymer comprises an ethylene polymer.

7. A process according to claim 1 wherein the polymer comprises an ethylene-vinyl acetate copolymer.

8. A process according to claim 1 wherein the weight ratio of polymer to water in said dispersion system is from about 0.1:1 to about 3:1; the weight ratio of soap to polymer is from about 0.01:1 to about 0.3:1; and the salt is present at from about 0.1 to about 15% based on the weight of water.

9. A process according to claim 1 wherein said dispersion system comprises an alkali metal soap of a dimerized polyunsaturated fatty acid.

10. A process according to claim 1 wherein said soap is sodium stearate.

* * * * *